United States Patent [19]

Hoenig, Sr.

[11] Patent Number: 5,092,057
[45] Date of Patent: Mar. 3, 1992

[54] LOCATING AND LEVELING TOOL

[76] Inventor: Richard T. Hoenig, Sr., 821 7th Ave., North Troy, N.Y. 12182

[21] Appl. No.: 618,888

[22] Filed: Nov. 28, 1990

[51] Int. Cl.$^5$ .......................... G01B 5/12; G01C 9/26
[52] U.S. Cl. ........................................ 33/669; 33/332; 33/340; 33/760; 33/770
[58] Field of Search .................. 33/759, 760, DIG. 10, 33/451, 666, 668, 574, 578, 528, 339, 340, 332, 669, 770

[56] References Cited

U.S. PATENT DOCUMENTS

| | | | |
|---|---|---|---|
| 3,242,578 | 3/1966 | Moll | 33/340 |
| 4,429,466 | 2/1984 | Leonard | 33/DIG. 10 X |
| 4,648,185 | 3/1987 | Brandimarte | 33/669 |
| 4,793,069 | 12/1988 | McDowell | 33/DIG. 10 X |

FOREIGN PATENT DOCUMENTS 2750716  5/1979  Fed. Rep. of Germany ........ 33/332

Primary Examiner—Harry N. Haroian

[57] ABSTRACT

A tool for locating a pair of points on a horizontal line at a desired distance from a reference point is disclosed including an elongated body carrying a pair of slidable selectively positonable spaced apart locator members and a scale for indicating the spacing between the indicator members and a bubble gauge for indicating a horizontal position of the indicator members. A tape measure is mounted for extension perpendicular from the body member for measuring the distance from the indicator members to the reference point at the free end of the extended tape measure.

2 Claims, 2 Drawing Sheets

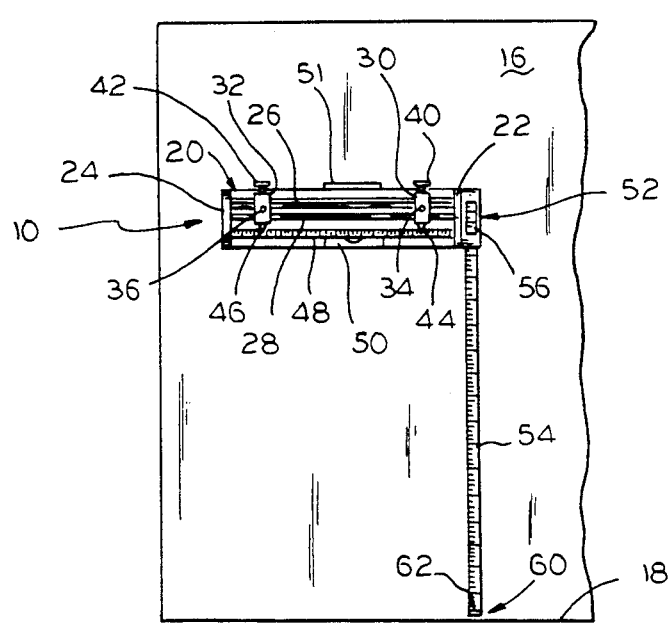
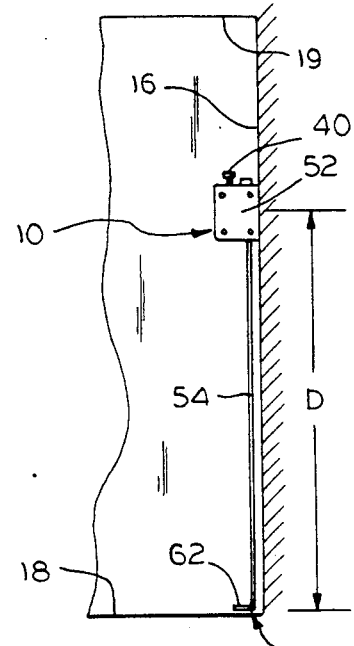
FIG.1     FIG.2
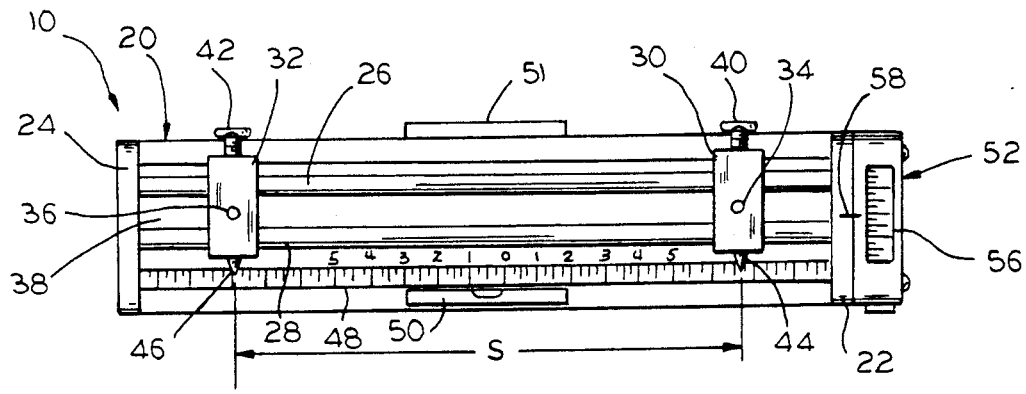
FIG.3
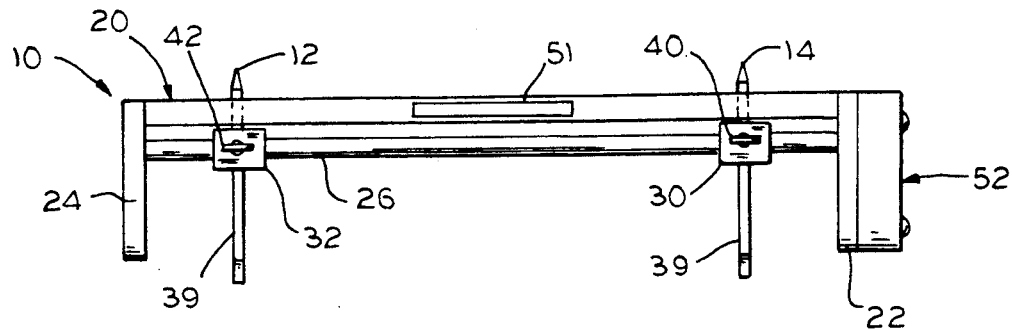
FIG.4

LOCATING AND LEVELING TOOL

BACKGROUND OF THE INVENTION

This invention relates to a tool for locating two points on horizontal line at a desired distance from a reference point.

When hanging objects such as picture frames on a wall, it is of course necessary that the points at which the frame is to be attached be on a common horizontal line so that the frame being hung will be orientated properly in a level position. Leveling devices and tools for locating mounting locations on a vertical wall are known such as the leveling tool disclosed in U.S. Pat. No. 4,648,185 which includes a pair of slidable locating members on an elOngated member carrying a scale for indicating the spacing between the locator members and a bubble gauge for indicating a level orientation of the indicators. In this prior art device, the indicator members are positioned at a desired spacing with the tool placed against the wall on which the locations are to be marked with the bubble gauge indicating a horizontal position whereupon the proper locations are indicated by the locator members. Other devices for locating horizontal spaced apart points on a vertical surface are disclosed in U.S. Pat. Nos. 3,516,165; 3,530,591; 4,241,510 and 4,813,149.

While these devices are effective in locating horizontal spaced apart locations on a vertical surface, none provide for locating the points at a desired distance relative to a reference point such as a floor or ceiling. Heretofore, the user must independently measure with a separate instrument the desired distance from the floor or ceiling whereat the item is to be hung or, alternatively, simply estimate the desired distance which not always results in an acceptable location and, when many items are intended to be located at a common distance from a floor, merely estimating such distance seldom results in uniform location of the items.

It is therefore an object of this invention to provide for a device which provides for both locating at least two points on a horizontal line, that is, in a level orientation, but which also provides for locating the two points at a desired distance from a reference point such as a floor or ceiling of a room.

SUMMARY OF THE INVENTION

The shortcomings of the prior art are overcome and the objects of the invention are achieved according to the invention which provides for an elongated member having means for guiding and holding a pair of spaced apart locator members having means for indicating the location of two points at selected spacings, a bubble gauge for indicating a level condition of the indicating means and tape measure means mounted to the elongated member for measuring the desired distance from the reference point to the indicating means on the locator members.

According to a preferred embodiment, the tape measure means includes an extensible retractable tape measure mounted to one end of the elongated member for extension and retraction perpendicular to the elongated member.

According to a preferred embodiment, a free end of the tape measure includes a projection adapted to be held against the reference point, such as the floor of the room, by the user's foot.

BRIEF DESCRIPTION OF THE DRAWINGS

The invention will be better understood after reading the following Detailed Description of the Preferred Embodiment in conjunction with the drawings in which:

FIG. 1 is a schematic representation showing the leveling and locating tool according to the invention in use;

FIG. 2 is a schematic representation taken toward one end of the device according to the invention showing the tool in use;

FIG. 3 is a front view of a preferred embodiment of the invention showing details of construction;

FIG. 4 is a top view of the preferred embodiment of FIG. 3 showing further details of construction.

DETAILED DESCRIPTION OF THE PREFERRED EMBODIMENT

Figure 5:
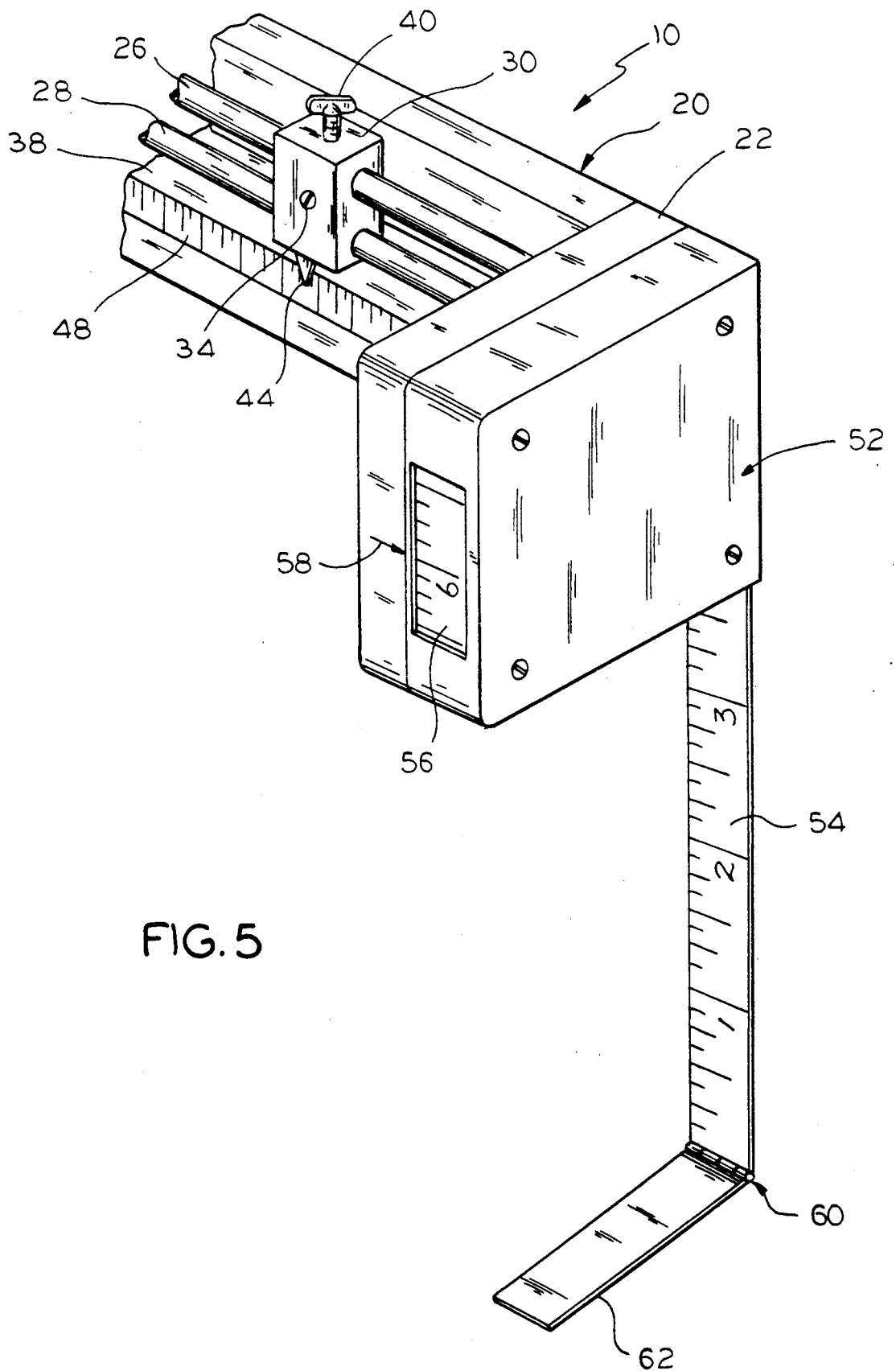
FIG. 5 is an enlarged view of one end of the preferred embodiment of FIG. 3 showing further details of construction.

Shown in FIGS. 3 and 4 is a combination locator and leveling tool 10 for locating a pair of mounting points 12, 14 on a vertical surface such as a wall 16 shown in FIGS. 1 and 2 at a desired distance D from a reference point such as a floor 18 or ceiling 19. According to a preferred embodiment, the locator-leveler 10 includes an elongated body 20 preferably on the order of two or three feet in length, although these lengths are not to be considered limiting, having opposing ends projecting outwardly from the body. The end members 22, 24 define supports between which a pair of guide rods 26, 28 are supported and on which a pair of locator members 30, 32 are slidably mounted. As shown in FIG. 3, the body 20 of the tool is slotted longitudinally and each locator member 30, 32 is provided with a hole 34, 36 aligned with the slot 38 in the body. The center of the holes 34, 36 lie on a common line parallel to the longitudinal axis of the body and are preferably sized to receive a common wood pencil 39 which can be inserted through each hole and through the slot in the body so as to make an accurate identification mark on the vertical surface 16 at selected positions of each hole to accordingly indicate the location of the two parts on the surface. Each locator member 30, 32 includes a set screw 40, 42 releasably engaging one of the guide rods such as rod 26 providing for retention of each locator member at selected positions along the length of the guide rod. A lower respective edge of each locator member includes an indicator or pointer 44, 46 aligned with the center of the hole in the locator member which co-operates with a longitudinal scale 48 provided on the body for indicating the horizontal spacings between the holes provided in the locators. Preferably, the mid point of the scale would be located at the midpoint along the length of the body and identified as the zero or reference point with equal increasing scale increments extending outwardly from the zero point toward opposite ends of the tool. Accordingly, the locator members and indicator holes can be positioned at known spacings relative to each other and relative to the center of the tool.

As shown in FIG. 3, the body member 20 is provided with a bubble gauge 50 orientated parallel with the line through the center of the indicator holes in each locator member providing for orientating the locator member indicator holes on a common horizontal line. A pencil holder 51 could be provided for convenience if desired.

Referring to FIG. 5, one end of the device is provided with an extensible-retractable measuring device 52 in the form of a tape measure mounted to an outside surface of one support member, such as member 22 in the drawings. The tape measure is graduated in desired increments, such as inches, with the scale increments 54 exposed through a window 56 provided in a front edge of the tape measure and which cooperate with an index or reference mark 58 provided on a front edge of the adjoining support member 22. The reference mark 58 on the support member in turn preferably coincides with the line through the indicator holes 34, 36 which in the embodiment shown is also the longitudinal axis of the slot 38. It can be seen that, as the tape measure scale 54 is pulled out from the tape measure housing 52 with the indicator holes 34, 36 in a level state as indicated by the bubble gauge 50, the scale markings on the tape measure will appear through the tape measure window 56 and indicate the distance D from the center of the indicator holes in the locator members to the free end 60 of the tape measure. That is, the distance from the reference point, the floor, to the horizontal line on which the points will lie will be given. It should be noted that the reference mark 58 on the support member which cooperates with the tape scale 54 need not coincide with the horizontal line extending through the indicator holes, but the scale and reference mark must be calibrated to read out the true distance D from the free end 60 of the tape to the center of the indicator holes. Preferably and advantageously, the free end 60 of the tape measure is provided with a laterally extending projection 62 which ca be either rigidly or pivotally attached to the free end of the tape measure.

In use, when it is desired to locate a pair of points on a vertical surface at a desired distance above a reference point, such as from a floor when hanging a picture frame, and, when it is desired to locate more than one pair of points at the same distance from a reference point, such as when hanging more than one picture frame at a common distance from a room's floor, the user would preferably first position the locator members so that the indicator holes are spaced as desired and then extend the tape measure to the desired vertical location as indicated in the tape measure window by holding the tape measure extended by stepping on and holding the projection on the end of the tape measure on the floor and placing the tool against the wall's surface in a level condition as indicated by the bubble gauge. Upon positioning the locator members in the horizontal orientation at the desired position, marks or holes can be made on the wall's surface by inserting a pencil or other round implement through the location indicating holes in the respective locators as shown in FIG. 9. Subsequent pairs of points can be located by relocating the tool to another location and again holding the tape measure free end against the floor and extending the device to the same or another desired vertical position as indicated in the tape measure window and again marking the the position through the indicator holes. Either the same locator spacing or a different locator spacing can be adjusted as desired.

It can be seen that the tool according to the invention provides for accurate, fast and repeatable location of a pair of points on a horizontal line on a vertical surface relative to a reference point and having described the preferred embodiment of the invention, those skilled in the art having the benefit of the description and the accompanying drawings, can readily devise other embodiments and modifications which are to be considered to be within the scope of the appended claims.

What is claimed is:

1. A tool for locating two points on a horizontal line at a desired distance from a reference point comprising:
    an elongated member having a longitudinal axis, said elongated member including an elongated guide member mounted parallel to the longitudinal axis;
    a pair of locator members each including means for indicating the location of one of said two points, said means for indicating lying on a common line, each locator member mounted for independent slidable movement along the guide member and including means for releasably retaining said locator members at selected positions along said guide member;
    a bubble gauge mounted to said elongated member for indicating a horizontal orientation of the common line through the means for indicating; and
    an extensible-retractable tape measure means mounted to said elongated member for extension and retraction perpendicular to said common line through said means for indicating for measuring said desired distance from said reference point to said means for indicating, said tape measure means including a laterally extending member attached to a free end of said tape measure means extending perpendicularly from said tape measure a distance sufficient to be stepped on and held by a user's foot to a floor.

2. The tool as defined in claim 1 wherein said laterally extending member is a pad-like projection pivotally attached to said free end of said tape measure.

* * * * *